(12) United States Patent
Ye et al.

(10) Patent No.: US 9,532,000 B2
(45) Date of Patent: Dec. 27, 2016

(54) METHOD AND SYSTEM FOR SENDING AND PLAYING MEDIA DATA IN TELEPRESENCE TECHNOLOGY

(71) Applicant: ZTE Corporation, Shenzhen (CN)

(72) Inventors: Xiaoyang Ye, Shenzhen (CN); Dong Wang, Shenzhen (CN); Yanzi Yang, Shenzhen (CN); Yuanjiang Peng, Shenzhen (CN)

(73) Assignee: XI'AN ZTE NEW SOFTWARE COMPANY LIMITED, High-Tech District (CN)

( * ) Notice: Subject to any disclaimer, the term of this patent is extended or adjusted under 35 U.S.C. 154(b) by 0 days.

(21) Appl. No.: 15/159,651

(22) Filed: May 19, 2016

(65) Prior Publication Data

US 2016/0269683 A1      Sep. 15, 2016

Related U.S. Application Data

(62) Division of application No. 14/001,762, filed as application No. PCT/CN2011/082884 on Nov. 24, 2011, now Pat. No. 9,363,474.

(30) Foreign Application Priority Data

Mar. 4, 2011   (CN) .......................... 2011 1 0053344

(51) Int. Cl.
*H04N 7/15*        (2006.01)
*H04N 21/2365*   (2011.01)
(Continued)

(52) U.S. Cl.
CPC ............... *H04N 7/15* (2013.01); *G06F 3/165* (2013.01); *H04N 21/2365* (2013.01); *H04N 21/4307* (2013.01)

(58) Field of Classification Search
CPC combination set(s) only.
See application file for complete search history.

(56) References Cited

U.S. PATENT DOCUMENTS 7,177,985 B1 * 2/2007 Diefendorff ........ G06F 12/0862
                                                                  711/118
7,612,793 B2   11/2009 Potekhin
(Continued)

FOREIGN PATENT DOCUMENTS

CN   1883197 A    12/2006
CN   1929593 A     3/2007
(Continued)

OTHER PUBLICATIONS

International Search Report in international application No. PCT/CN2011/082884 , mailed on Mar. 8, 2012.
(Continued)

*Primary Examiner* — Joseph J Nguyen
(74) *Attorney, Agent, or Firm* — Oppedahl Patent Law Firm LLC

(57) ABSTRACT

The present disclosure discloses a method and system for sending media data in telepresence technology. By collecting audio or video data corresponding to a spatial area, the collected data is processed respectively to acquire multiple streams of data distinguished by a collecting spatial area and corresponding collecting spatial information; the multiple streams of data are encoded, encoded multiple streams of audio data and the collecting spatial information are packed together, and/or encoded multiple streams of video data and the collecting spatial information are packed together, and a packet including multiple streams of audio or video data is sent, respectively. The present disclosure also discloses a method and system for playing media data in telepresence technology. With the methods and systems, it is possible to directly identify the corresponding collecting spatial area,
(Continued)

i.e., a corresponding playing location in the process of data transmission, which enables a conferee at a receiving end to experience auditory positioning and an immersive sensation. Further, the problem of synchronization among the multiple streams of audio or video data is solved effectively.

2 Claims, 3 Drawing Sheets

(51) Int. Cl.
*H04N 21/43* (2011.01)
*G06F 3/16* (2006.01)

(56) References Cited

U.S. PATENT DOCUMENTS

| | | | |
|---|---|---|---|
| 8,064,754 B2 | 11/2011 | Lomba | |
| 2003/0001948 A1* | 1/2003 | Mochizuki | H04N 7/17318 348/14.01 |
| 2003/0149792 A1* | 8/2003 | Goldstein | H04L 12/1836 709/246 |
| 2007/0064094 A1* | 3/2007 | Potekhin | H04M 3/567 348/14.08 |
| 2007/0182865 A1* | 8/2007 | Lomba | H04N 7/142 348/725 |
| 2008/0065888 A1* | 3/2008 | Zheng | H04L 9/0844 713/171 |
| 2008/0273078 A1 | 11/2008 | Grasley | |
| 2010/0182394 A1 | 7/2010 | Zhan | |
| 2012/0050456 A1* | 3/2012 | Arnao | H04N 7/152 348/14.12 |

FOREIGN PATENT DOCUMENTS

| | | |
|---|---|---|
| CN | 1984310 A | 6/2007 |
| CN | 101132516 A | 2/2008 |
| CN | 101427574 A | 5/2009 |
| CN | 101809998 A | 8/2010 |
| CN | 101938626 A | 1/2011 |

OTHER PUBLICATIONS

English Translation of the Written Opinion of the International Search Authority in international application No. PCT/CN2011/082884, mailed on Mar. 8, 2012.

SIP:Session Initiation Protocol, RFC3261, 2002,06, *Network working group>>, J. Rosenberg, H. Schulzrin, ne, et al, mailed on Jun. 30, 2002.

Hardware scheme of multi-channel audio/video encoder, Wang Shi-gang, Zhu Yu-hong, Wang lin-fang, Gong Ke-Jun, (College of Communication Engineering, Jilin university,Changchun 130012,China), mailed on Aug. 30, 2003.

* cited by examiner

METHOD AND SYSTEM FOR SENDING AND PLAYING MEDIA DATA IN TELEPRESENCE TECHNOLOGY

CROSS REFERENCE TO RELATED APPLICATIONS

This is a divisional application of U.S. application Ser. No. 14/001,762, which itself is based on International Patent Application No. PCT/CN2011/082884 filed on Nov. 24, 2011, which claims priority to Chinese Patent Application No. 201110053344.5 filed on Mar. 4, 2011, the disclosure of all of which is incorporated by reference herein in its entirety.

TECHNICAL FIELD

The disclosure relates to the video conference technology, and in particular to a method and system for sending and playing media data in telepresence technology.

BACKGROUND

Telepresence is an advanced teleconference system, and enjoys great popularity among high-end users due to a true sense of on-scene presence thereof. In a telepresence system, auditory positioning, life size imaging, and eye contact directly concern whether the users can have an immersive sensation, and therefore are key technical indicators in evaluating the telepresence system. In a traditional video conference system, sound heard in each meeting room is the mixed and superimposed sound from several loudest meeting rooms in the entire conference, and each meeting room has only one sound input source and output, so that the users can not sense from which direction of the meeting room the sound is issued.

In a telepresence conferencing system, each meeting room is either a single-screen meeting room or a multi-screen meeting room. In the multi-screen meeting room, each screen shows an image of conferees within one spatial area corresponding to one stream of audio input. If it is to achieve the effect of auditory positioning, in the multi-screen meeting room, sound is issued from the direction in which the screen of the meeting room showing the image of a speaker is located, that is, the sound is made to follow the image. For example, in a three-screen meeting room, if a speaker seated on the left speaks, then the conferees should hear sound issued from the left side; if a speaker seated in the middle speaks, then the conferees should hear sound issued from in the middle; if a speaker seated on the right speaks, then the conferees should hear sound issued from the right side.

In this case, audio inputs/outputs from different directions need to be handled and mixed differently; it is obvious that a traditional method of single-stream audio mixing cannot be satisfactory in such a case. Meanwhile, in a multipoint conference with intercommunication between the single-screen meeting room and the multi-screen meeting room, a problem of how to mix and output sound from the single-screen meeting room and the multi-screen meeting room without affecting auditory positioning in both meeting rooms also needs to be solved. Further, if a way of respective transmission of multiple streams is adopted, it is very difficult to achieve rigorous synchronization among the multiple streams to meet the audio synchronization requirement of a video conference.

SUMMARY

In view of the above, the main purpose of the present disclosure is to provide a method and system for sending and playing media data in telepresence technology, which enable a conferee at a receiving end to experience auditory positioning and an immersive sensation, and further solve the problem of difficult audio synchronization or video synchronization when media data are transmitted by way of respective transmission of multiple streams in an existing video conference system.

To solve the aforementioned technical problems, the technical solution of the present disclosure is implemented as follows.

The present disclosure provides a method for sending media data in telepresence technology, including:

collecting audio or video data corresponding to a spatial area, and processing the collected audio or video data respectively to acquire multiple streams of data distinguished by a collecting spatial area and collecting spatial information of each stream of data; and encoding the multiple streams of data, packing together encoded multiple streams of audio data and the collecting spatial information, and/or packing together encoded multiple streams of video data and the collecting spatial information, and sending a packet including multiple streams of audio or video data, respectively.

Wherein, the packet including multiple streams of audio or video data may include a packet header and a packet body, wherein the packet header carries an identifier for each stream of audio or video data and indicates a stream length, the identifier corresponds to the collecting spatial information; the packet body carries content of the multiple streams of data.

Wherein, the processing the collected audio or video data respectively specifically is: processing the video or audio data collected at each collecting spatial area respectively as one stream of data.

The present disclosure further provides a method for playing media data in telepresence technology, including:

after receiving a packet including multiple streams of audio or video data, parsing out, by a receiving end, multiple streams of audio data or video data and collecting spatial information of each stream of data; and outputting, by the receiving end, the multiple streams of audio data or video data according to a playing location corresponding to the collecting spatial information of each stream of data to complete the playing.

Wherein, the parsing out, by a receiving end, multiple streams of audio data or video data and collecting spatial information of each stream of data specifically is: reading a stream identifier of a packet header to acquire the collecting spatial information of the stream data, and parsing out the corresponding multiple streams of audio data or video data from a packet body according to a stream length.

The present disclosure further provides a system for sending media data in telepresence technology, including: one or multiple audio-video collecting devices, a multi-stream data processing module, and a multi-stream data transmitting module, wherein the one or multiple audio-video collecting devices are configured to collect audio or video data corresponding to a spatial area respectively and send the collected data to the multi-stream data processing module;

the multi-stream data processing module is configured to process the collected audio or video data respectively to acquire multiple streams of data distinguished by a collecting spatial area and collecting spatial information of each stream of data, and send the multiple streams of data as well as the collecting spatial information to the multi-stream data transmitting module; and the multi-stream data transmitting module is configured to encode the multiple streams of data, pack together encoded multiple streams of audio data and the collecting spatial information, and/or pack together encoded multiple streams of video data and the collecting spatial information, and send a packet including multiple streams of audio or video data, respectively.

Wherein, the packet including multiple streams of audio or video data may include a packet header and a packet body, wherein the packet header carries an identifier for each stream of audio or video data and indicates a stream length, the identifier corresponds to the collecting spatial information; the packet body carries content of the multiple streams of data.

Wherein, processing, by the multi-stream data processing module, the collected audio or video data respectively specifically is: processing, by the multi-stream data processing module, the video or audio data collected at each collecting spatial area respectively as one stream of data.

The present disclosure further provides a system for playing media data in telepresence technology, including: multiple audio-video playing devices, a multi-stream data processing module, and a multi-stream data transmitting module, wherein the multi-stream data transmitting module is configured to receive and parse a packet including multiple streams of audio or video data sent by the multi-stream data transmitting module of a sending end, and send the parsed multiple streams of audio data or video data as well as collecting spatial information of each stream of data to the multi-stream data processing module of a receiving end; and the multi-stream data processing module is configured to send the multiple streams of audio data or video data to an audio-video playing device corresponding to the collecting spatial information of each stream of data to complete the playing.

In the method and system for sending and playing media data in telepresence technology provided by the present disclosure, audio or video data corresponding to a spatial area are collected, the collected audio or video data are processed respectively to acquire multiple streams of data distinguished by a collecting spatial area and collecting spatial information of each stream of data; and the multiple streams of data are encoded, the encoded multiple streams of audio data and the collecting spatial information are packed together, and/or encoded multiple streams of video data and the collecting spatial information are packed together, and a packet including multiple streams of audio or video data is sent, respectively. It is possible to directly identify the corresponding collecting spatial area, i.e., a corresponding playing location in the process of data transmission, which enables a conferee at a receiving end to experience auditory positioning and an immersive sensation. Further, it is unnecessary to perform additional audio synchronization or video synchronization.

DETAILED DESCRIPTION

The basic idea of the present disclosure is that: video or audio data corresponding to a spatial area are collected, and are processed respectively to acquire multiple streams of data distinguished by a collecting spatial area and collecting spatial information of each stream of data; the multiple streams of data are encoded, encoded multiple streams of audio data and the collecting spatial information are packed together, and/or encoded multiple streams of video data and the collecting spatial information are packed together, and a packet including multiple streams of audio or video data is sent, respectively.

A technical solution of the present disclosure is further elaborated below with reference to accompanying figures and specific embodiments.

Figure 1:
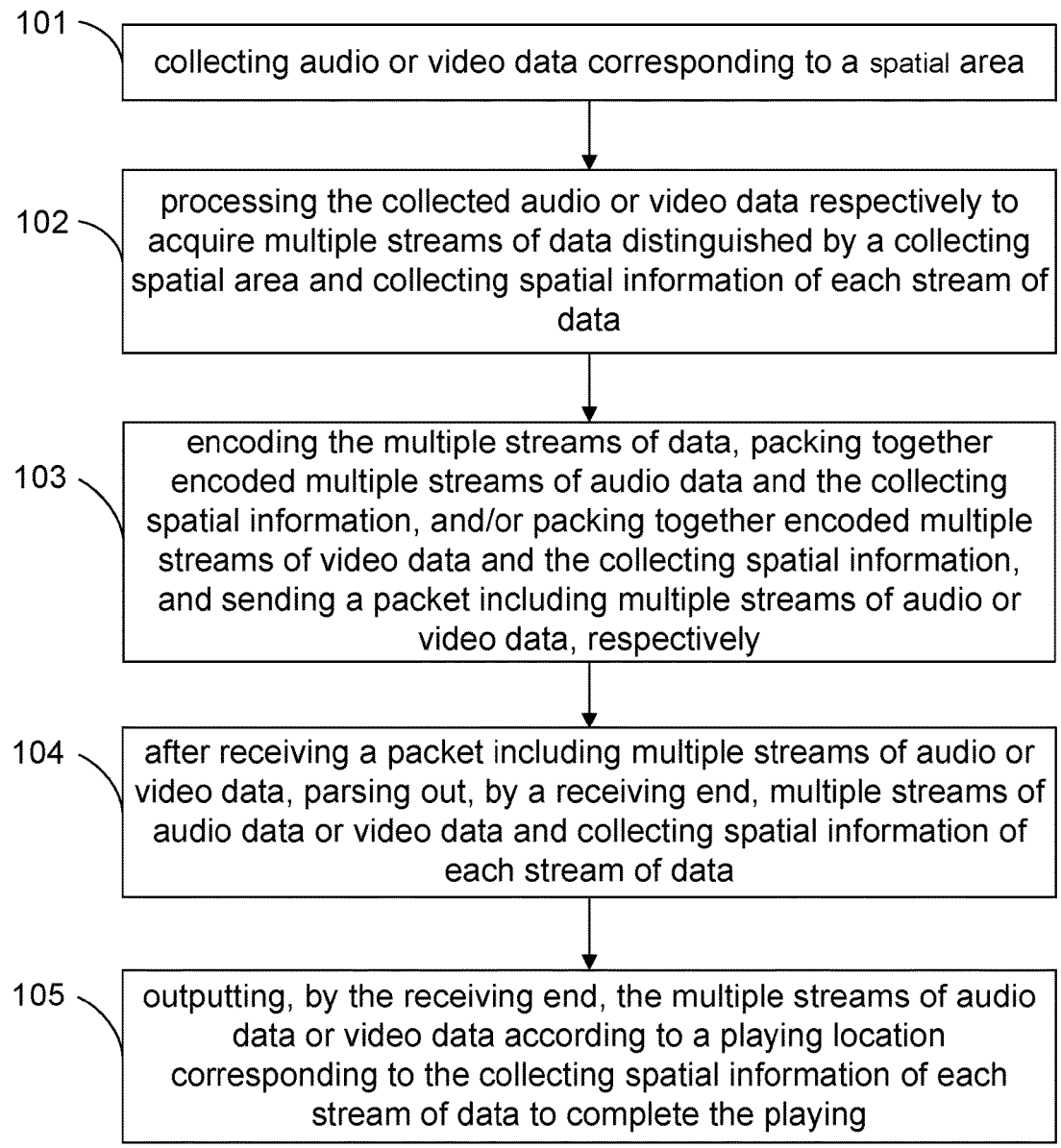
FIG. 1 is a flow chart of a method for sending and playing media data in telepresence technology of the present disclosure.

FIG. 1 is a flow chart of a method for sending and playing media data in telepresence technology of the present disclosure. As shown in FIG. 1, the method includes:

Step 101, collecting audio or video data corresponding to a spatial area;

Specifically, the collecting audio or video data corresponding to a spatial area is specifically completed by a video collecting device and an audio collecting device installed at different collecting spatial areas.

Step 102, processing the collected audio or video data respectively to acquire multiple streams of data distinguished by a collecting spatial area and collecting spatial information of each stream of data;

Specifically, the processing the collected audio or video data respectively specifically is: processing respectively the video or audio data collected at each collecting spatial area as one stream of data. Wherein, the processing respectively is to distinguish according to different collecting spatial areas.

For example, there are three collecting spatial areas of the left, the middle, and the right in a three-screen meeting room. The data collected by left-side video and audio collecting devices are processed respectively to acquire left-side video stream data and left-side audio stream data, wherein the left-side audio stream data correspond to a left sound-channel played by a receiving end; the data collected by right-side video and audio collecting devices are processed respectively to acquire right-side video stream data and right-side audio stream data, wherein the right-side audio stream data corresponds to a right sound-channel played by the receiving end; the data collected by middle video and audio collecting devices are processed respectively to acquire middle video stream data and middle audio stream data. Wherein, the middle audio stream data may correspond to a middle sound-channel played by the receiving end, or may simultaneously correspond to the left sound-channel and the right sound-channel played by the receiving end. When simultaneously hearing the same sound played by the left and the right sound-channels, a conferee would feel that the sound is from the middle, i.e., right in front. Further, for a meeting room with more than three screens, the collecting spatial area of the audio data is reflected by adjusting the volume of different sound-channels. In principle, the closer the sound-channel is to the collecting spatial area, the louder the volume is.

Step 103, encoding the multiple streams of data, packing together encoded multiple streams of audio data and the collecting spatial information, and/or packing together encoded multiple streams of video data and the collecting spatial information, and sending a packet including multiple streams of audio or video data, respectively.

Specifically, the encoding the multiple streams of data specifically is: encoding the multiple streams according to a transport protocol. The packet including multiple streams of audio or video data includes, at a header of the packet, an identifier added respectively for each stream of video or audio data and an indicated stream length, and then the specific content of the stream data added to a packet body. Wherein, the added identifier is configured to correspond to the respective collecting spatial area of the stream data.

Figure 2:
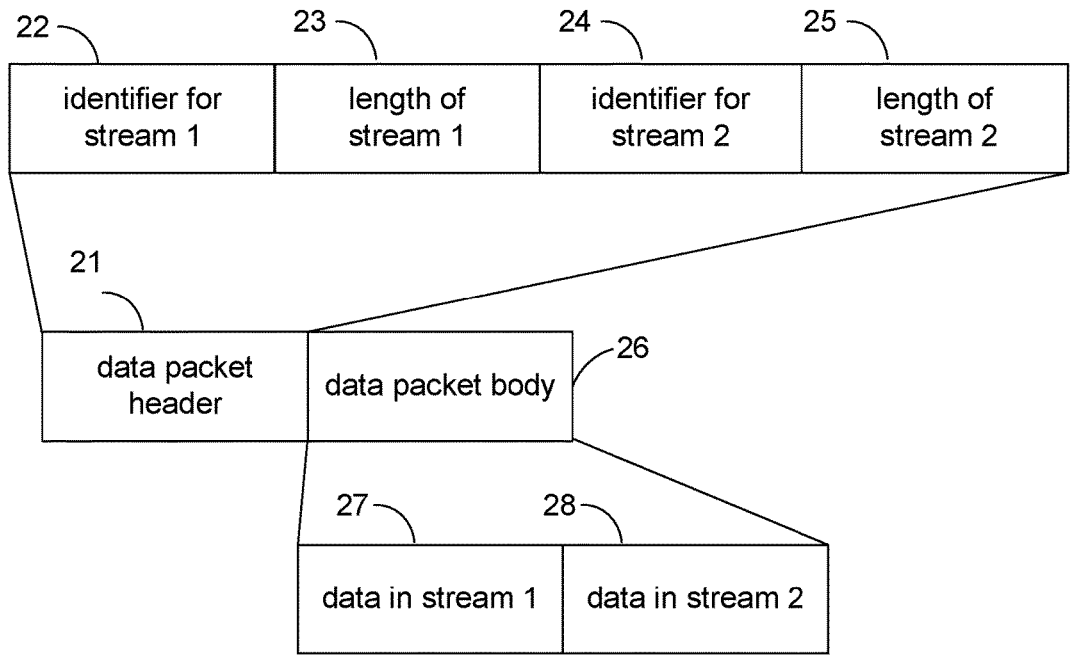
FIG. 2 is a schematic diagram of a structure of a packet including multiple streams of audio or video data of the present disclosure.

FIG. 2 is a schematic diagram of a structure of a packet including multiple streams of audio or video data of the present disclosure. As shown in FIG. 2, where a data packet header 21 includes: identifier 22 for stream 1, length 23 of stream 1, identifier 24 for stream 2, length 25 of stream 2. A data packet body 26 includes: data 27 in stream 1 and data 28 in stream 2. In the packet including multiple streams of audio or video data of the present disclosure, it is possible to add stream identifiers and indicate stream lengths respectively for multiple streams, so that the multiple streams may be packed into a packet including multiple streams of audio or video data, which makes it possible to well solve the problem of synchronization of the multiple streams. Further, as the identifier corresponding to the collecting spatial area is added, it is possible to restore a playing location of the audio data according to the collecting spatial area at the receiving end, thereby achieving auditory positioning.

After the step 103, in order for the receiving end to play the packet including multiple streams of audio or video data, the method further includes:

Step 104, after receiving a packet including multiple streams of audio or video data, parsing out, by a receiving end, multiple streams of audio data or video data and collecting spatial information of each stream of data;

Specifically, parsing the packet including the multiple streams of audio or video data specifically is: reading an identifier of a packet header to acquire the collecting spatial area of the stream data, and parsing out the corresponding multiple streams of audio data or video data from a packet body according to a stream length.

Step 105, outputting, by the receiving end, the multiple streams of audio data or video data according to a playing location corresponding to the collecting spatial information of each stream of data to complete the playing.

Specifically, outputting the content of the parsed stream data to the corresponding playing location in the meeting room to complete the playing, then the conferees may experience auditory positioning.

Figure 3:
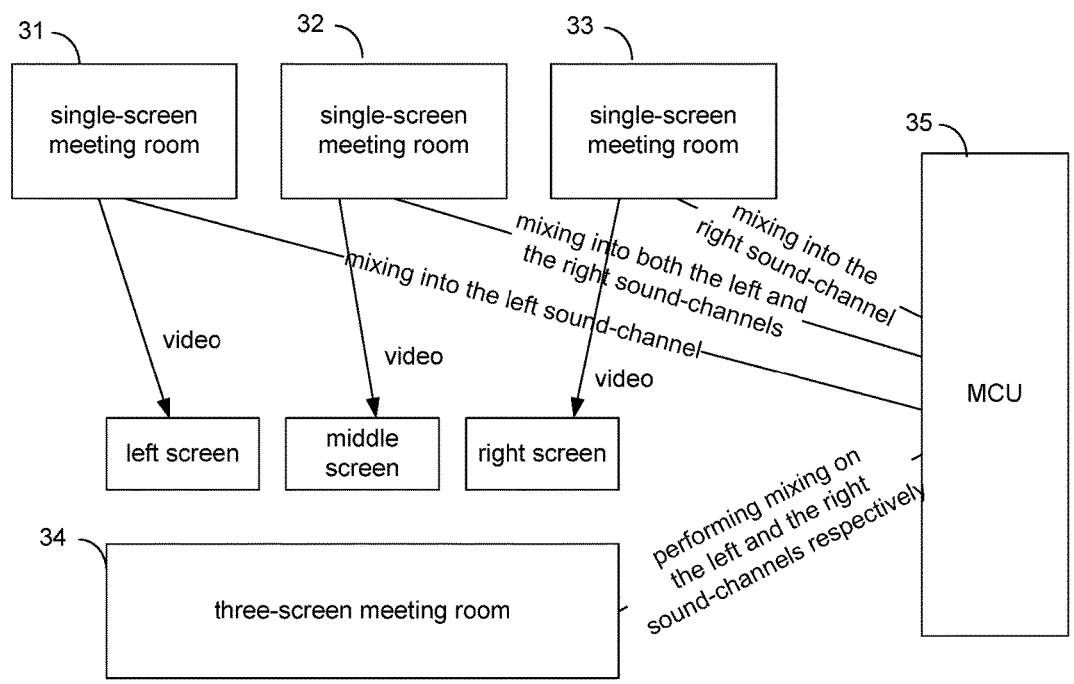
FIG. 3 is a schematic diagram of movements of audio and video streams communicated according to the present disclosure within a network formed by three single-screen meeting rooms and one multi-screen meeting room.

FIG. 3 is a schematic diagram of movements of audio and video streams communicated according to the present disclosure within a network formed by three single-screen meeting rooms and one multi-screen meeting room. As shown in FIG. 3, the three single-screen meeting rooms are a single-screen meeting room 31, a single-screen meeting room 32, and a single-screen meeting room 33, respectively. The three single-screen meeting rooms and one three-screen meeting room 34 form a network, in which videos of the three single-screen meeting rooms are successively displayed on the left, middle, and right screens of the multi-screen meeting room, and each single-screen meeting room may choose to watch the video of any spatial area of the three-screen meeting room 34.

First, audio streams collected by multiple audio collecting devices in the three-screen meeting room 34 are input to and processed by an audio processor device, and then divided into audio stream data of both left and right sound-channels; and then stream data of the two sound-channels are encoded respectively by a telepresence multimedia terminal responsible for the three-screen meeting room 34 and packed into a packet including multiple streams of audio data for sending. In the embodiment, a packet structure of Real-time Transport Protocol (RTP) is taken as an example, and Table 1 is an extended structure of the packet including multiple streams of audio or video data in the RTP.

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|   CC  |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|              synchronization source (SSRC) identifier         |
+=+=+=+=+=+=+=+=+=+=+=+=+=+=+=+=+=+=+=+=+=+=+=+=+=+=+=+=+=+=+=+=+
|               contributing source (CSRC) identifiers          |
|                              ...                              |
+-+-+-+-+-+-+-+-+-+-+-+-+-+-+-+-+-+-+-+-+-+-+-+-+-+-+-+-+-+-+-+-+
|    RTP H-Ext ID   |      length     |  posID1  |    length1   |
+-+-+-+-+-+-+-+-+-+-+-+-+-+-+-+-+-+-+-+-+-+-+-+-+-+-+-+-+-+-+-+-+
|  posID2  |      length2     |  posID3  |       length3        |
+=+=+=+=+=+=+=+=+=+=+=+=+=+=+=+=+=+=+=+=+=+=+=+=+=+=+=+=+=+=+=+=+
|                           RTP payload                         |
|                              ...                              |
+-+-+-+-+-+-+-+-+-+-+-+-+-+-+-+-+-+-+-+-+-+-+-+-+-+-+-+-+-+-+-+-+
```

As shown in Table 1, a standard RTP header structure part is filled according to a specification defined by RFC3550. An extended part is described as follows.

In the RTP H-Ext ID field, an RTP extended header identifier is denoted by 2 bytes, for example, assigned with a value 0x0011;

In the length field, the length of an extended RTP header field is denoted by 2 bytes, and the location information and the length of one stream occupy 2 bytes all together; therefore the total number of streams included behind is acquired by filling and parsing a numerical value of this field; In the embodiment, taking as an example one packet including left and right audio streams, the numerical value of the length field is thus 4 bytes;

In the posID1 field, 4 bytes are utilized to denote location information of stream 1, for example, 0001B denotes a left sound-channel stream, 0010B denotes a right sound-channel stream, if there are more than two streams, then they may be distinguished specifically by this field;

Length1 denotes the length of a stream corresponding to the posID1;

In the posID2 field, 4 bytes are utilized to denote location information of stream 2;

Length2 denotes the length of a stream corresponding to the posID2;

Further, posID3 and length3 are also included in Table 1 which may be further extended as required to carry audio data streams of more sound-channels.

RTP payload is a data body, in which the corresponding audio stream data are stored successively in the order of posID1, posID2.

The telepresence system multimedia terminal sends the data packed and encoded in the above-mentioned way to a Multipoint Control Unit (MCU) 35, which sends the packet including the multiple streams of audio data to the receiving end.

The three single-screen meeting rooms may also encode and pack the respective audio stream data in the above-mentioned way and then send the data to the MCU 35; If the single-screen meeting rooms have no audio processor device, then the respective telepresence system multimedia terminals of the single-screen meeting rooms may send the packet with the same left and right sound-channel data directly to the MCU 35. After receiving the stream data sent by the telepresence system multimedia terminal of the above meeting rooms, MCU 35 may acquire the location information and the stream length corresponding to each stream of data by parsing an extended RTP data packet header, and perform mixing-sending processing according to a video displaying location; For example, in the embodiment, the MCU 35 mixes the audio stream data of the single-screen meeting room 31 into the left sound-channel data, mixes the audio stream data of the single-screen meeting room 32 into both left and right sound-channel data simultaneously, mixes the audio stream data of the single-screen meeting room 33 into the right sound-channel data, and then packs according to the aforementioned extended RTP data packet structure and sends the packet to the telepresence system multimedia terminal of the three-screen meeting room 34.

The MCU 35 performs sound mixing respectively on the left sound-channel and the right sound-channel data in the audio stream data of the single-screen meeting rooms 32, 33, 34, and then sends the stream to the telepresence system multimedia terminal of the single-screen meeting room 31 according to the aforementioned extended RTP data packet structure. The telepresence system multimedia terminal of the single-screen meeting room 31 parses out the location information as well as the corresponding stream data of the left sound-channel and the right sound-channel stream after receiving the packet, decodes them respectively, and outputs the left and the right sound-channel data respectively to left and right loudspeaker boxes through the audio processor device, thereby achieving the effect of auditory positioning. If the single-screen meeting room has only one loudspeaker box, then both the left and the right sound-channel data are output to the same loudspeaker box.

The MCU 35 performs sound mixing respectively on the left sound-channel and the right sound-channel data in the audio stream data of the single-screen meeting rooms 31, 33, 34, and then sends the stream to the telepresence system multimedia terminal of the single-screen meeting room 32 according to the aforementioned extended RTP data packet structure. The processing of the single-screen meeting room 32 is the same as that of the single-screen meeting room 31.

The MCU 35 performs sound mixing respectively on the left sound-channel and the right sound-channel data in the audio stream data of the single-screen meeting rooms 31, 32, 34, and then sends the stream to the telepresence system multimedia terminal of the single-screen meeting room 33 according to the aforementioned extended RTP data packet structure. The processing of the single-screen meeting room 33 is the same as that of the single-screen meeting room 31.

Further, the video data in the embodiment may also be packed into a packet including multiple streams of video data according to the above-mentioned method for transmission. Wherein the posID1, the posID2 may identify the collecting spatial areas of the video stream data, and may also correspond to the playing locations of the multiple screens in a receiving end meeting room. In particular, it should be noted that the single-screen meeting room may switch in between the parsed multiple streams of data as required.

Figure 4:
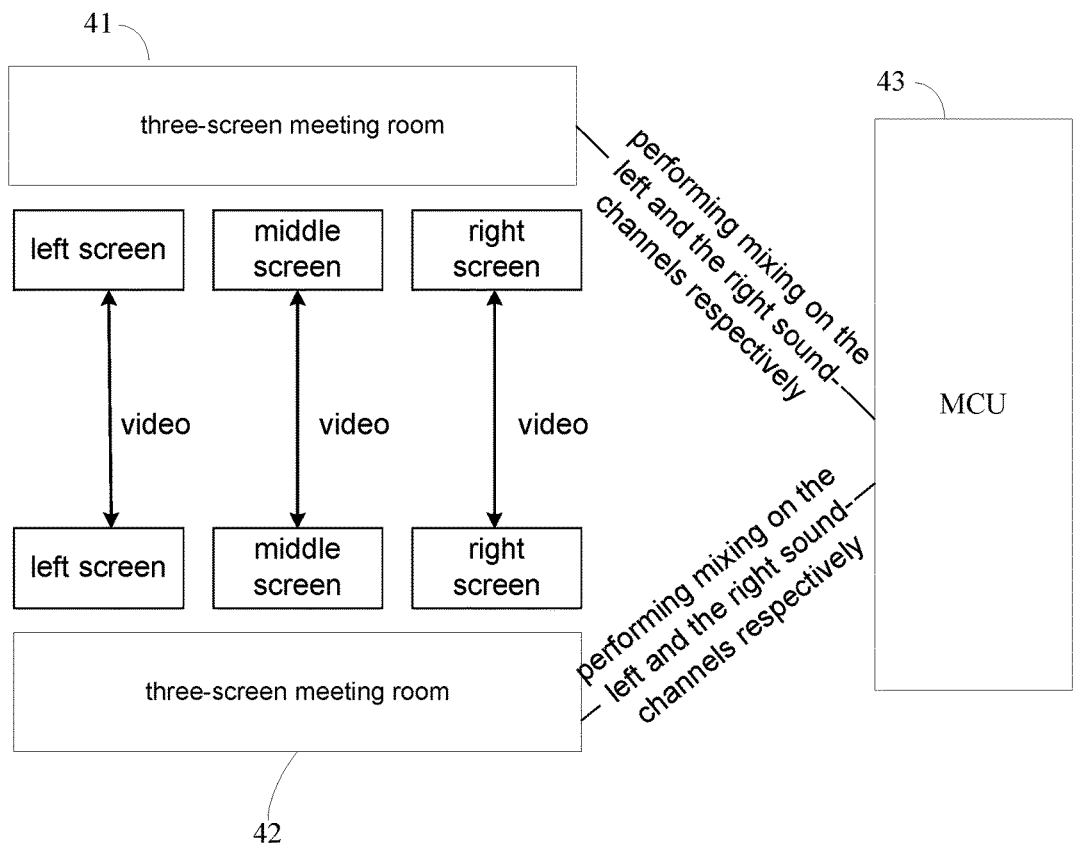
FIG. 4 is a schematic diagram of movements of audio and video streams communicated according to the present disclosure within a network formed by two three-screen meeting rooms.

FIG. 4 is a schematic diagram of movements of audio and video streams communicated according to the present disclosure within a network formed by two three-screen meeting rooms. As shown in FIG. 4, the two three-screen meeting rooms form a point-to-point network, and the videos of the left, middle, and right spatial areas of the three-screen meeting room 41 are displayed successively on the left, middle, and right screens of the three-screen meeting room 42, and the videos of the left, middle, and right spatial areas of the three-screen meeting room 42 are displayed successively on the left, middle, and right screens of the three-screen meeting room 41. All audio streams collected by multiple audio collecting devices of the three-screen meeting room 41 are input to and processed by the audio processor device, and are divided into left and right sound-channel stream data; both the left and the right sound-channel streams are then encoded and packed respectively by the telepresence multimedia terminal and sent to the telepresence multimedia terminal at the opposite end, wherein the packing part is the same as described in the embodiment of FIG. 3. After receiving the data including both the left and the right sound-channel streams, the telepresence multimedia terminal of the three-screen meeting room 42 parses the location information as well as the corresponding stream data of the left and the right sound-channel streams, decodes them respectively, and outputs the left and the right sound-channel data respectively to the left and right loudspeaker boxes through the audio processor device, thereby achieving the effect of auditory positioning. In the embodiment, the processing is similar when the network is formed through MCU 43, the stream data however need to be transferred respectively to the telepresence multimedia terminals of the meeting rooms participating the conference through the MCU 43. If there are three or more meeting rooms participating the conference, then the MCU 43 is required to be involved in the stream data processing.

Figure 5:
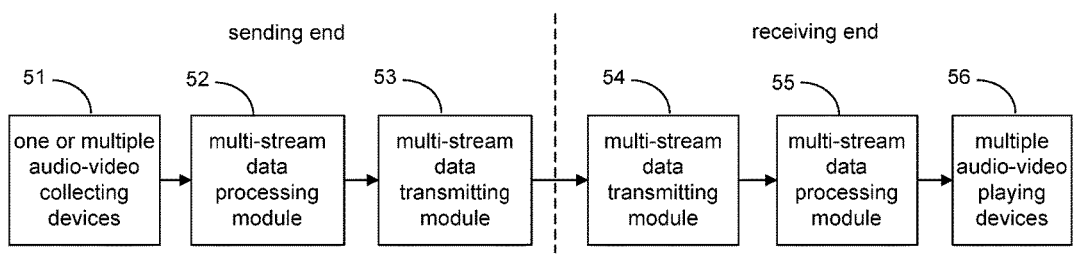
FIG. 5 is a schematic diagram of a structure of a system for sending and playing media data in telepresence technology of the present disclosure.

FIG. 5 is a schematic diagram of a structure of a system for sending and playing media data in telepresence technology of the present disclosure. As shown in FIG. 5, a sending end of the system includes one or multiple audio-video collecting devices 51, a multi-stream data processing module 52, and a multi-stream data transmitting module 53, wherein the one or multiple audio-video collecting devices 51 are configured to collect video or audio data corresponding to a spatial area respectively and send the collected data to the multi-stream data processing module 52;

The multi-stream data processing module 52 is configured to process the collected audio or video data respectively to acquire multiple streams of data distinguished by a collecting spatial area and collecting spatial information of each stream of data, and send the multiple streams of data as well as the collecting spatial information to the multi-stream data transmitting module 53;

Specifically, processing, by the multi-stream data processing module 52, the collected audio or video data respectively specifically is: processing respectively, by the multi-stream data processing module, the audio or video data collected at each collecting spatial area as one stream of data. Wherein, the processing respectively is to distinguish according to different collecting spatial areas.

For example, there are three collecting spatial areas of the left, the middle, and the right in a three-screen meeting room. The data collected by left-side video and audio collecting devices are processed respectively to acquire left-side video stream data and left-side audio stream data, wherein the left-side audio stream data correspond to a left sound-channel played by a receiving end; the data collected by right-side video and audio collecting devices are processed respectively to acquire right-side video stream data and right-side audio stream data, wherein the right-side audio stream data corresponds to a right sound-channel played by the receiving end; the data collected by middle video and audio collecting devices are processed respectively to acquire middle video stream data and middle audio stream data. Wherein, the middle audio stream data may correspond to a middle sound-channel played by the receiving end, or may simultaneously correspond to the left sound-channel and the right sound-channel played by the receiving end. When simultaneously hearing the same sound played by the left and the right sound-channels, a conferee would feel that the sound is from the middle, i.e., right in front. Further, for a meeting room with more than three screens, the collecting spatial area of the audio data is reflected by adjusting the volume of different sound-channels. In principle, the closer the sound-channel is to the collecting spatial area, the louder the volume is.

The multi-stream data transmitting module 53 is configured to encode the multiple streams of data, pack together encoded multiple streams of audio data and the collecting spatial information, and/or pack together encoded multiple streams of video data and the collecting spatial information, and send a packet including multiple streams of audio or video data, respectively.

Specifically, the encoding the multiple streams of data specifically is: encoding the multiple streams according to a transport protocol. The packet including multiple streams of audio or video data includes, at a header of the packet, an identifier added respectively for each stream of video or audio data and an indicated stream length, and then the specific content of the stream data added to a packet body. Wherein, the added identifier is configured to correspond to the respective collecting spatial information of the stream data. In the packet including multiple streams of audio or video data of the present disclosure, it is possible to add stream identifiers and indicate stream lengths respectively for multiple streams, so that the multiple streams may be packed into a packet including multiple streams of audio or video data, which makes it possible to well solve the problem of synchronization of the multiple streams. Further, as the identifier corresponding to the collecting spatial area is added, it is possible to restore a playing location of the audio data according to the collecting spatial area at the receiving end, thereby achieving auditory positioning.

Further, at the receiving end, the system also includes a multi-stream data transmitting module 54, a multi-stream data processing module 55, and multiple audio-video playing devices 56, wherein the multi-stream data transmitting module 54 is configured to receive and parse a packet including multiple streams of audio or video data sent by the multi-stream data transmitting module 53 of a sending end, and send the parsed multiple streams of data as well as the collecting spatial information of each stream of data to the multi-stream data processing module 55 of the receiving end;

The multi-stream data processing module 55 is configured to send the multiple streams of audio or video data to an audio-video playing device 56 corresponding to the collecting spatial information of each stream of data to complete the playing.

Specifically, parsing, by the multi-stream data transmitting module 54, the packet including the multiple streams of audio or video data specifically is: reading an identifier of a packet header to acquire the collecting spatial information of the stream data, and parsing out the corresponding multiple streams of audio data or video data from a packet body according to a stream length. The parsed stream data content is then output to the playing location in the meeting room corresponding to the collecting spatial area to complete the playing, and thus the conferees may experience auditory positioning.

Apparently, those skilled in the art may perform various alterations and modifications of the present disclosure without departing from the spirit and scope of the present disclosure. Thus, if the various revisions and modifications of the present disclosure fall within the scope of the claims of the present disclosure as well as equivalent technology thereof, then the present disclosure also intends to contain these alterations and modifications.

The invention claimed is:

1. A method for playing media data in telepresence technology, comprising:

receiving, by a system for playing media data in telepresence technology comprising multiple audio-video playing devices, a packet comprising multiple streams of audio or video data each collected at a collecting location, wherein the packet comprises a header and a body, the header comprising an identifier and a stream length of a respective stream of video or audio data of the multiple streams of audio or video data, the identifier denoting information on a collecting location where the respective stream of video or audio data is collected, the body comprising content of the multiple streams of audio or video data successively in same order as identifiers of collecting locations comprised in the header;

reading, by the system for playing media data in telepresence technology, the identifier comprised in the header of the packet to acquire the information on the collecting location of the respective stream of video or audio data, and parsing out the content of the respective stream of video or audio data comprised in the body of the packet according to the stream length of the respective stream of video or audio data; and outputting, by the system for playing media data in telepresence technology, the content of the respective stream of video or audio data to an audio-video playing device at a playing location corresponding to the collecting location of the respective stream of video or audio data for playing.

2. A system for playing media data in telepresence technology, comprising: multiple audio-video playing devices, a multi-stream data processing module, and a multi-stream data transmitting module, wherein the multi-stream data transmitting module is configured to: receive a packet comprising multiple streams of audio or video data each collected at a collecting location, the packet comprising a header and a body, the header comprising an identifier and a stream length of a respective stream of video or audio data of the multiple streams of audio or video data, the identifier denoting information on a collecting location where the respective stream of video or audio data is collected, the body comprising content of the multiple streams of audio or video data successively in same order as identifiers of collecting locations comprised in the header; read the identifier comprised in the header of the packet to acquire the information on the collecting location of the respective stream of video or audio data; parse out the content of the respective stream of video or audio data comprised in the body of the packet according to the stream length of the respective stream of video or audio data; and send the parsed content and the information on the collecting location of the respective stream of video or audio data to the multi-stream data processing module; and the multi-stream data processing module is configured to send the content of the respective stream of video or audio data to an audio-video playing device at a playing location corresponding to the collecting location of the respective stream of video or audio data for playing.

* * * * *